(12) United States Patent
Sang et al.

(10) Patent No.: US 12,518,289 B2
(45) Date of Patent: Jan. 6, 2026

(54) RING CODE, CODING METHOD, METHOD FOR IDENTIFYING RING CODE, METHOD FOR APPLYING RING CODE, AND SEAL AND ELECTRONIC FILE

(71) Applicant: MATRIXNETS TECHNOLOGY CO., LTD., Hebei (CN)

(72) Inventors: Haiming Sang, Hebei (CN); Ge Gan, Hebei (CN)

(73) Assignee: MATRIXNETS TECHNOLOGY CO., LTD., Hebei (CN)

( * ) Notice: Subject to any disclaimer, the term of this patent is extended or adjusted under 35 U.S.C. 154(b) by 115 days.

(21) Appl. No.: 18/575,569

(22) PCT Filed: Jun. 27, 2022

(86) PCT No.: PCT/CN2022/101404
§ 371 (c)(1),
(2) Date: Dec. 29, 2023

(87) PCT Pub. No.: WO2023/274108
PCT Pub. Date: Jan. 5, 2023

(65) Prior Publication Data
US 2024/0296465 A1 Sep. 5, 2024

(30) Foreign Application Priority Data
Jul. 1, 2021 (CN) .......................... 202110744834.3

(51) Int. Cl.
*G06Q 30/018* (2023.01)
*G06K 7/14* (2006.01)
*G06K 19/06* (2006.01)

(52) U.S. Cl.
CPC ....... *G06Q 30/0185* (2013.01); *G06K 7/1413* (2013.01); *G06K 19/06028* (2013.01)

(58) Field of Classification Search
CPC ............ G06Q 30/0185; G06K 7/1413; G06K 19/06028; G06K 19/00; G06F 16/00; G06F 16/381
(Continued)

(56) References Cited

U.S. PATENT DOCUMENTS 11,351,809 B2 * 6/2022 Costa ............... G06K 19/06121
2002/0143711 A1 * 10/2002 Nassiri ............... G06Q 20/3821
705/76
(Continued)

FOREIGN PATENT DOCUMENTS

CN 101414360 A 4/2009
CN 201552817 U 8/2010
(Continued)

*Primary Examiner* — Edwyn Labaze
(74) *Attorney, Agent, or Firm* — Muncy, Geissler, Olds & Lowe, P.C.

(57) ABSTRACT

The present invention involves a ring code, an encoding method, a method for identifying the ring code, an application method of the ring code, a seal and an electronic file of the seal, wherein contents recorded in the ring code correspond to a electronic file containing the electronic seal or the digital seal, and contents of different electronic files correspond to different ring codes; the ring code comprises an anti-counterfeiting code and a ring encryption area, and the anti-counterfeiting code fills the ring encryption area; an encoding method comprises acquiring data to be encoded, converting the data to be encoded into the anti-counterfeiting code, and filling the anti-counterfeiting code in the ring encryption area; and a method for identifying the ring code comprises acquiring a starting position of the anti-counterfeiting code, segmenting the anti-counterfeiting code from the starting position and expanding the anti-counterfeiting code to form a bar code, and scanning the bar code to obtain data coded. The anti-counterfeiting code is 360 degrees around the ring encryption area, which is uniform and (Continued)

beautiful; therefore overall visual effect is more unified with the traditional seal, which makes the ring code more secure and difficult to crack.

34 Claims, 9 Drawing Sheets

(58) Field of Classification Search
USPC .................. 235/375, 487, 462.01, 462.03
See application file for complete search history.

(56) References Cited

U.S. PATENT DOCUMENTS

| | | | |
|---|---|---|---|
| 2005/0125666 A1* | 6/2005 | Lin .................... | H04N 1/00127 713/170 |
| 2009/0015553 A1* | 1/2009 | Hirahara ............... | G06F 3/0488 345/158 |
| 2019/0080127 A1* | 3/2019 | Yoshida .............. | G06F 3/04162 |
| 2020/0082139 A1* | 3/2020 | Peeters .............. | A61B 5/14514 |

FOREIGN PATENT DOCUMENTS

| | | | | |
|---|---|---|---|---|
| CN | 106682479 A | | 5/2017 | |
| CN | 109754045 A | * | 5/2019 | |
| CN | 113486997 A | | 10/2021 | |
| CN | 113902079 A | * | 1/2022 | ............. G06F 21/64 |
| KR | 20090102309 A | | 9/2009 | |

* cited by examiner

RING CODE, CODING METHOD, METHOD FOR IDENTIFYING RING CODE, METHOD FOR APPLYING RING CODE, AND SEAL AND ELECTRONIC FILE

TECHNOLOGY FIELD

The present invention relates to the technical field of anti-counterfeiting, in particular to a ring code, an encoding method, a method for identifying the ring code and a seal.

BACKGROUND TECHNOLOGY

An official seal refers to a seal used by organs, organizations, enterprises and institutions, and the seal comprises a seal surface and a seal pad. The seal surface is the core area of the seal, and the content on the seal surface represents the organs, organizations, enterprises and institutions.

Usually, the seal comprises a ring, enterprise name and enterprise logo, wherein the ring indicates a boundary of the seal and the enterprise name and enterprise logo are all set inside the ring. In order to further improve privacy of the seal, an anti-counterfeiting mark is usually set on the boundary ring of the seal.

The existing seal anti-counterfeiting mark comprises a first encryption area and a second encryption area. Usually, role of the second encryption area is to identify the first encryption area, so as to reduce identification difficulty of data in the first encryption area and facilitate rapid positioning of anti-counterfeiting data and determination of authenticity.

However, due to an addition of the second encryption area, data capacity in the first encryption area is reduced, which limits complexity of encrypted information.

SUMMARY OF THE INVENTION

Therefore, the present invention provides a ring code, an encoding method, a method for identifying the ring code, a seal, and an application method and an electronic file of the seal, which can solve the problem of limited complexity of encrypted information in an anti-counterfeiting mark.

In order to achieve the above purposes, the present invention firstly provides a ring code, comprising a ring code used for an electronic seal or a digital seal; wherein contents recorded in the ring code correspond to a electronic file containing the electronic seal or the digital seal, and contents of different electronic files correspond to different ring codes; the ring code comprises an anti-counterfeiting code and a ring encryption area, and the anti-counterfeiting code fills the ring encryption area.

Further, the electronic seal or the digital seal or the ring code comprises but is not limited to a circle, an ellipse, a square, a rectangle and a triangle.

Further, the electronic seal or digital seal comprises but is not limited to being used on electronic products namely, personal computer terminals, smart phones, mobile terminals, handheld printing devices, tablet computers, vehicle-mounted computers, and the electronic seal is displayed through display screens of the above terminals.

Further, the ring code comprises a ring code with a single encrypted pattern, or a mixed ring code formed by two or more encrypted patterns, or an identifiable anti-counterfeiting code with any other encrypted patterns.

Further, the ring code comprises a bar code, or a bar-shaped mixed code formed by combining a bar code with one or more other encrypted patterns, or an identifiable anti-counterfeiting code with any other encrypted patterns.

Further, the bar-shaped mixed code is formed by combining the bar code and a quick response code.

Further, a code head of the bar code or the bar-shaped mixed code is connected with a code tail thereof to form the anti-counterfeiting code; and the code head is a starting symbol and the code tail is an ending symbol.

Further, the anti-counterfeiting code comprises a code 93 barcode, or a code 93 bar-shaped mixed code composed of the code 93 barcode and one or more other encrypted patterns.

Further, the code head of the code 93 barcode or the code 93 bar-shaped mixed code is connected with the code tail thereof to form the anti-counterfeiting code, wherein the code head is the starting symbol and the code tail is the ending symbol.

Further, the anti-counterfeiting code is formed by removing the starting symbol and the ending symbol in the standard code 93 barcode or the code 93 bar-shaped mixed code, and then connecting a head end and a tail end.

Further, the present invention further comprises indicators to indicate starting positions of the anti-counterfeiting code.

Further, the indicators are numbers, Chinese characters or words or letters in other languages.

Further, the numbers, the Chinese characters or the words or the letters in other languages are a name of the company to which the seal belongs, and connecting lines between any pixel point in any character in the name of the company and a geometric center of the ring encryption area are taken as starting lines, and intersections of the starting lines and the ring encryption area are taken as the starting positions.

Further, the electronic seal or digital seal comprises, but is not limited to, seals of party committees and government agencies, military, diplomatic, financial, social organizations and schools and research institutes, seals of various enterprises and institutions, seals of various administrative examination and approval, invoices, special seals for financial bills or personal seals.

Further, the indicators comprise patterns.

Further, the indicators comprise, but are not limited to, a five-pointed star, a party emblem or a national emblem located in a center of the seal.

Further, one of the patterns comprises the five-pointed star, with the connecting lines between any corner of the five-pointed star and the geometric center of the ring encryption area as the starting lines, and the intersections of the starting lines and the ring encryption area as the starting positions.

Further, the anti-counterfeiting code is repeated at least twice on a whole circumference or a frame of the seal.

Further, the ring encryption area is arranged inside or outside the closed boundary line of the seal; correspondingly, an inner or outer boundary of the ring encryption area comprises or does not comprise a closed boundary line.

A second aspect of the present invention provides a ring code for an entity seal; the ring code for the entity seal comprises the ring code described above.

A third aspect of the present invention provides an encoding method, comprising: acquiring data to be encoded and converting the data to be encoded into the anti-counterfeiting code; and filling the anti-counterfeiting code in the ring encryption area.

The present invention further comprises removing the starting symbol and the ending symbol after converting the data to be encoded into the anti-counterfeiting code.

Further, filling the anti-counterfeiting code in the ring encryption area comprises:

filling at least one anti-counterfeiting code into the ring encryption area, wherein the ring encryption area comprises at least one closed ring, and the at least one anti-counterfeiting code is arranged inside or outside the closed ring.

A fourth aspect of the present invention provides a method for identifying the ring code, comprising:

randomly segmenting the ring code from any position and expanding the ring code into a shape of a bar code;

according to positions of the starting symbol and the ending symbol of the bar code, dividing the bar code into two segments;

reconnecting the two segments to form a bar code that starts with the starting symbol and ends with the ending symbol; and scanning the bar code and analyzing data obtained.

A fifth aspect of the present invention provides a method for identifying the ring code, comprising:

acquiring at least one starting position of the anti-counterfeiting code;

segmenting the anti-counterfeiting code from the at least one starting position and expanding the anti-counterfeiting code to form a bar code and scanning the bar code to obtain data coded.

Further, obtaining the at least one starting position of the anti-counterfeiting code comprises:

obtaining any pixel point in any character in the name of the company to which the seal belongs and the geometric center of the ring encryption area;

connecting any pixel point in any character in the name of the company with the geometric center of the ring encryption area as the at least one starting line;

acquiring at least one intersection of the at least one starting line and the ring encryption area.

Further, obtaining the starting position of the anti-counterfeiting code comprises: obtaining any specific pixel point of an internal pattern of the ring code and the geometric center of the ring encryption area;

connecting the pixel point and the geometric center of the ring encryption area as the at least one starting line; and acquiring at least one intersection of the at least one starting line and the ring encryption area.

Further, the internal pattern comprises the five-pointed star, and the specific pixel point is the point where any corner of the five-pointed star is located; and connecting the point of any corner of the five-pointed star with the geometric center of the ring encryption area as the at least one starting line.

A sixth aspect of the present invention provides a seal, and the ring code mentioned above is arranged on a seal surface.

Further, the seal is formed by printing.

Further, the ring code is directly output to a paper.

Further, the seal is in red, blue or in other colors.

A seventh aspect of the present invention provides an application method of the ring code, which stores the seal pattern comprising the ring code in a storage medium.

The present invention further comprising:

acquiring the electronic file of the electronic seal and the digital seal containing the ring code, or acquiring a printed file of the entity seal containing the ring code identifying the ring code in the electronic file or the printed file; and comparing the identified ring code with the ring code in the storage medium to determine authenticity of the electronic file or the printed file.

An eight aspect of the present invention provides an application method of the ring code, comprising:

acquiring an electronic contract and the electronic file of the electronic seal and the digital seal containing the ring code, or acquiring the printed file of the entity seal containing the ring code;

identifying the ring code in the electronic contract, the electronic file or the printed file and the ring code records the anti-counterfeiting information of the seal;

according to the anti-counterfeiting information of the seal, performing authenticity verification of the seal a third party in need.

Further, the anti-counterfeiting information of the seal comprises, but is not limited to, full text or some of the contract, full text or an abstract of the file, parties to the contract or file, signature time, a seal approval process, seal users and the place where the seal is used.

A ninth aspect of the present invention provides the electronic seal or the digital seal; and the electronic seal or digital seal comprises the ring code as described above.

Further, the electronic seal is used for displaying on screens.

Further, the screens comprise but are not limited to one or more display screens of electronic products such as personal computer terminals, smart phones, mobile terminals, hand-held printing devices, tablet computers, vehicle-mounted computers.

Further, the seal is in red or blue or in other colors.

A tenth aspect of the present invention provides an electronic file and the electronic file contains the electronic seal or digital seal as described above.

Further, the electronic file comprises, but is not limited to, electronic contracts, electronic official documents, electronic notices.

Compared with the prior art, the present invention has beneficial effects that the anti-counterfeiting code is 360 degrees around the ring encryption area, which is uniform and beautiful; and overall visual effect is more unified with the traditional seal, which makes the ring code more secure and difficult to crack.

Especially, on a circumference of the ring encryption area, a plurality of identical ring codes are repeatedly arranged, and the same data can be decoded independently for each ring code, so that even if the seal is defaced or damaged or the paper bearing the physical seal is partly torn off, information in the ring code can still be recognized, thus improving the security.

In particular, the ring encryption area can be provided with or without an outer ring. When there is no outer ring, interference to code scanning is reduced and code scanning speed and recognition rate is improved.

What's more, in a limited space of the ring area of the seal, if the starting position and the ending position are removed, data capacity of the ring code after improvement will increase.

EMBODIMENTS

In order to make the purpose and advantages of the present invention more clear, the present invention will be further described with embodiments. It should be understood that specific embodiments described here are only for explaining the present invention, and are not used to limit the present invention.

Preferred embodiments of the present invention will be described below with reference to the attached drawings. It should be understood by those skilled in the art that these embodiments are only used to explain technical principles of the present invention, and are not intended to limit protective scope of the present invention.

It should be noted that in description of the present invention, terms of direction or positional relationship indicated by terms "up", "down", "left", "right", "inside" and "outside" are based on the direction or positional relationship shown in the attached drawings, which is only for convenience of description, and does not indicate or imply that the device or element must have a specific orientation, be constructed and operated in a specific orientation, so it cannot be understood as limitations on the present invention.

In addition, it should be noted that in the description of the present invention, unless otherwise specified and limited, terms "installation" and "connection" should be broadly understood, for example, it can be fixed connection, detachable connection or integrated connection; it can be a mechanical connection or an electrical connection; it can be directly connected, can also be indirectly connected through an intermediate medium, and can be connected inside two elements. For those skilled in the art, specific meanings of the above terms in the present invention can be understood according to specific situations.

Referring to FIGS. 1 to 6, embodiments of the present invention provide a ring code 100 used for an electronic seal or a digital seal; wherein contents recorded in the ring code 100 correspond to an electronic file containing the electronic seal or the digital seal, and different electronic file contents correspond to different ring codes; the ring code 100 comprises an anti-counterfeiting code 101 and a ring encryption area 102, and the anti-counterfeiting code 101 fills the ring encryption area 102.

In the embodiments of the present invention, the anti-counterfeiting code fills circumferentially for 360 degrees around the ring encryption area, which is uniform and beautiful; and overall visual effect is more unified, which makes the ring code more secure and difficult to crack.

Specifically, the seal of the electronic seal or the digital seal in the embodiments of the invention, or a shape of the ring code can be a circle, an ellipse, a square, a rectangle and a triangle, and through setting the seal with different shapes, uses of the seal can be enriched.

Specifically, the electronic seal or the digital seal is able to be used on electronic products such as PC terminals, smart phones, mobile terminals, handheld printing devices, tablet computers, vehicle-mounted computers and the like, and the electronic seal or the digital seal is displayed through display screens of the above terminals, which makes use of the electronic seal and the digital seal more convenient.

Specifically, the ring code can be a ring code with one encrypted pattern, a mixed ring code 100 composed of two encrypted patterns, or a ring code composed of multiple encrypted patterns. The embodiments of the present invention do not limit the number of the encrypted patterns, as long as the encrypted patterns can be identified and the corresponding anti-counterfeiting code can be identified. According to the embodiments of the present invention, the anti-counterfeiting code is formed by encrypting the pattern, so that the anti-counterfeiting code is more beautiful and the identification degree of the ring code is improved.

Specifically, the ring code for the electronic seal or the digital seal provided by the embodiments of the present invention can also be a bar code, or a bar-shaped mixed code formed by combining a bar code with one or more other encrypted patterns, or an identifiable anti-counterfeiting code with any other encrypted patterns. According to the embodiments of the present invention, the ring code can be easily identified through the bar code, so that structure of the ring code is simpler and it is convenient to identify.

Specifically, the bar-shaped mixed code is formed by combining the bar code and a quick response code. The bar-shaped mixed code in the embodiments of the present invention is formed by combining the bar code and the quick response code, so that richness of the bar code is increased, so that different information can be represented by the ring code, and universality of the ring codes is improved. A code head of the bar code or the bar-shaped mixed code is connected with a code tail to form the anti-counterfeiting code, wherein the code head is a starting symbol and the code tail is an ending symbol.

Specifically, the anti-counterfeiting code comprises a code 93 barcode. The code head of the code 93 barcode is connected with the code tail thereof to form the anti-counterfeiting code, wherein the code head comprises the starting symbol 300 and the code tail comprises the ending symbol. The anti-counterfeiting code is formed by removing the starting and ending symbols in the standard code 93 barcode, and then connecting a head end and a tail end. The anti-counterfeiting code is the code 93 barcode, or the code 93 bar-shaped mixed code composed of the code 93 barcode and one or more other encrypted patterns. The code head of the code 93 barcode or the code 93 bar-shaped mixed code is connected with the code tail thereof to form the anti-counterfeiting code, wherein the code head is the starting symbol and the code tail is the ending symbol. The anti-counterfeiting code is formed by removing the starting and ending symbols in the standard code 93 barcode or the code 93 bar-shaped mixed code, and then connecting a head end and a tail end.

In a limited space of the ring encryption area, if a starting position and an ending position are removed, data capacity of the ring encryption code after improvement is increased.

Specifically, the ring code also comprises indicators to indicate starting positions of the anti-counterfeiting code. The indicators can be Chinese characters or patterns. The indicators are numbers, Chinese characters or words or letters in other languages. The numbers, the Chinese characters or the words or the letters in other languages are the name of the company to which the seal belongs, and connecting lines between any pixel point in any character in the name of the company and a geometric center of the ring encryption area are taken as starting lines, and intersections of the starting lines and the ring encryption area are taken as the starting positions. The electronic seal or the digital seal comprises, but is not limited to, seals of party committees and government agencies, military, diplomatic, financial, social organizations and schools and research institutes, seals of various enterprises and institutions, seals of various administrative examination and approval, invoices, special seals for financial bills or personal seals.

Specifically, the starting positions are set by elements in the bar code, which is convenient for identification and improves identification speed of the ring code.

Figure 1:
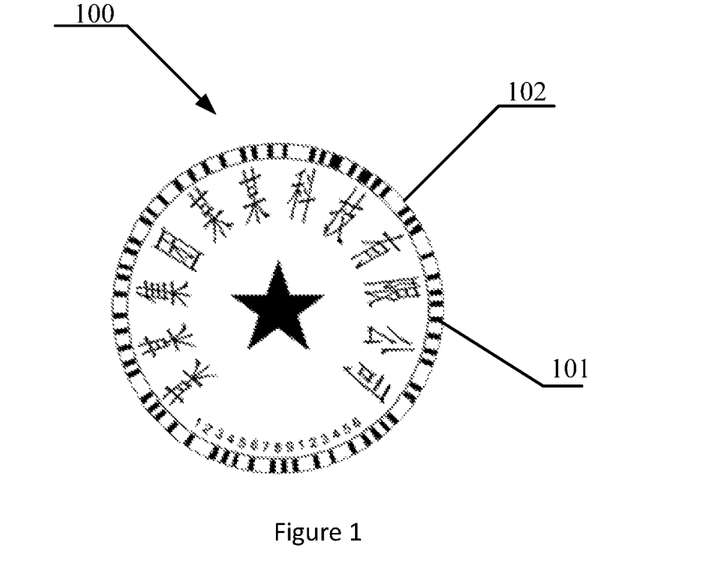
FIG. 1 is a schematic structural diagram of a ring code provided in an embodiment of the present invention.
Figure 2:
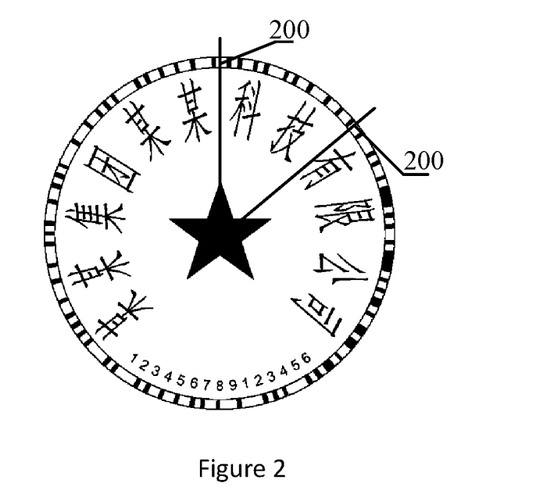
FIG. 2 is a schematic diagram of a starting position in the ring code provided in an embodiment of the present invention.
Figure 3:
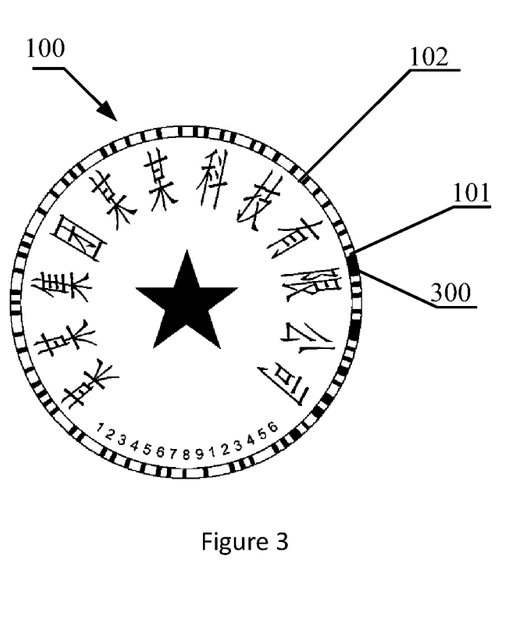
FIG. 3 is another structural schematic diagram of the ring code provided in an embodiment of the present invention.

Specifically, the Chinese characters are the name of the company, and the connecting line between any pixel point in any character in the name of the company and the geometric center of the ring encryption area are taken as the starting line, and the intersections of the starting line and the ring encryption area are taken as the starting positions 200.

Specifically, the starting positions are set by structure and components in the bar code, which is convenient for the identification and improves the identification speed of the ring code.

Specifically, the indicators comprise patterns. The indicators comprise, but are not limited to, a five-pointed star, a party emblem or a national emblem located in a center of the seal. One of the patterns is a five-pointed star, with the connecting lines between any corner of the five-pointed star and the geometric center of the ring encryption area as the starting lines, and intersections of the starting lines and the ring encryption area as the starting positions.

Specifically, there is at least one anti-counterfeiting code provided.

Figure 4:
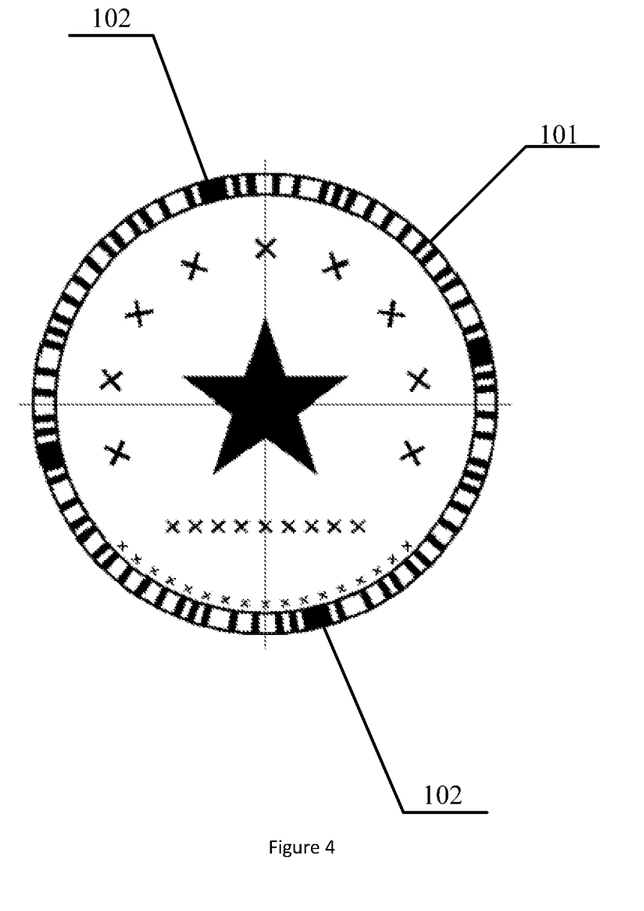
FIG. 4 is a schematic structural diagram of two repeated ring codes provided in an embodiment of the present invention.

As shown in FIG. 4, on a circumference of the ring encryption area, a plurality of identical ring codes are repeatedly arranged, and same data can be decoded independently in each ring code, so that even if the seal is defaced or damaged or the paper bearing the physical seal is partly torn off, information in the ring code can still be recognized, thus improving the security.

Specifically, the ring encryption area comprises at least one closed ring, and the anti-counterfeiting code is arranged inside or outside the at least one closed ring.

Figure 5:
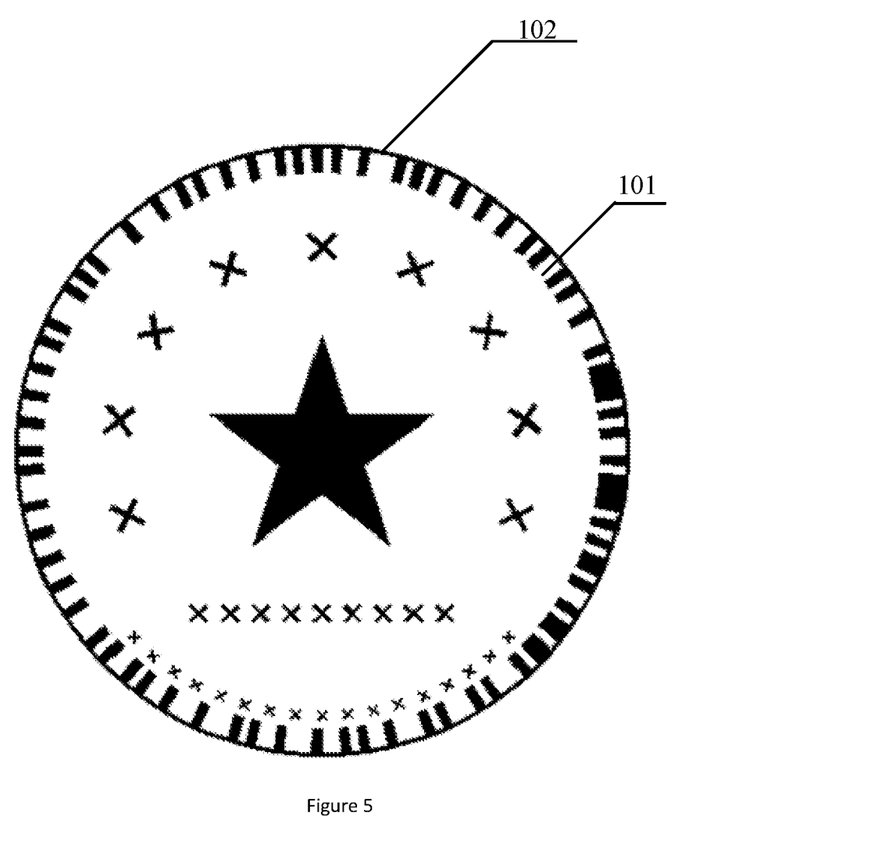
FIG. 5 is a schematic structural diagram of the ring code provided in an embodiment of the present invention without an outer frame.

As shown in FIG. 5, the ring encryption area can be provided with an outer ring and without an inner ring; when there is no inner ring, interference to code scanning is reduced and code scanning speed and recognition rate is improved.

Figure 6:
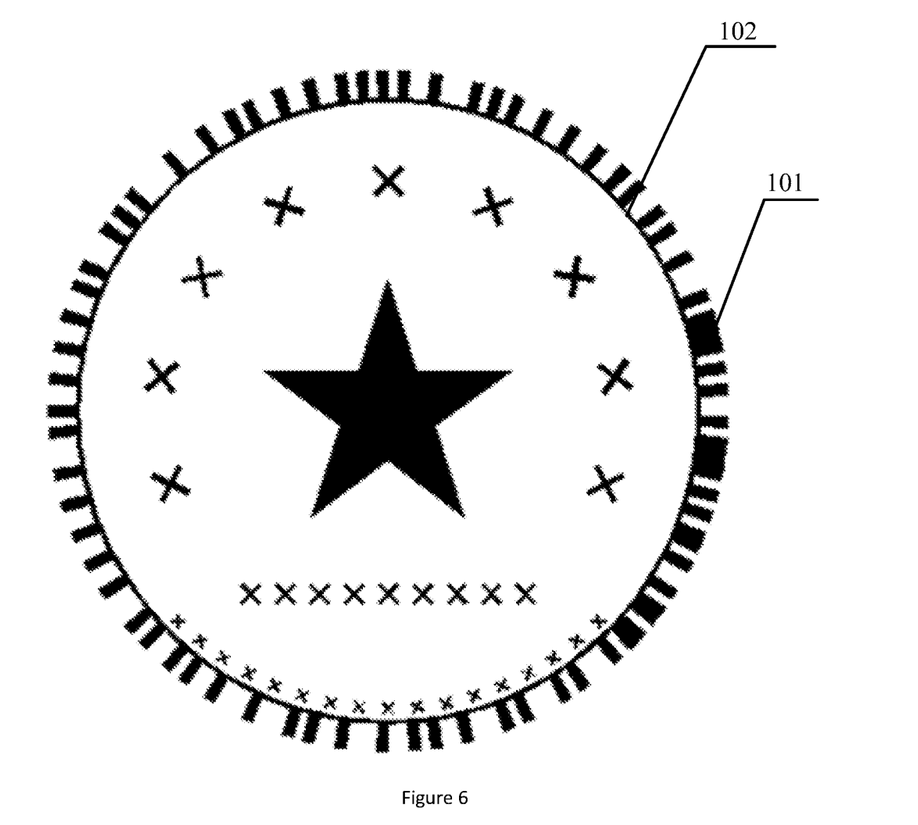
FIG. 6 is a schematic structural diagram of the ring code provided in an embodiment of the present invention without an inner frame.

As shown in FIG. 6, the ring encryption area is not provided with the outer ring; when there is no outer ring, the interference to the code scanning is reduced and the code scanning speed and recognition rate is improved.

The ring encryption area mentioned above can be provided with or without the outer ring; when there is no outer ring, the interference to the code scanning is reduced and the code scanning speed and recognition rate is improved.

Specifically, the embodiments of the present invention also provide a ring code for an entity seal; the ring code for the entity seal is the ring code described above.

The ring code for the entity seal provided by the embodiments of the invention is convenient to identify and has a simpler structure.

Figure 7:
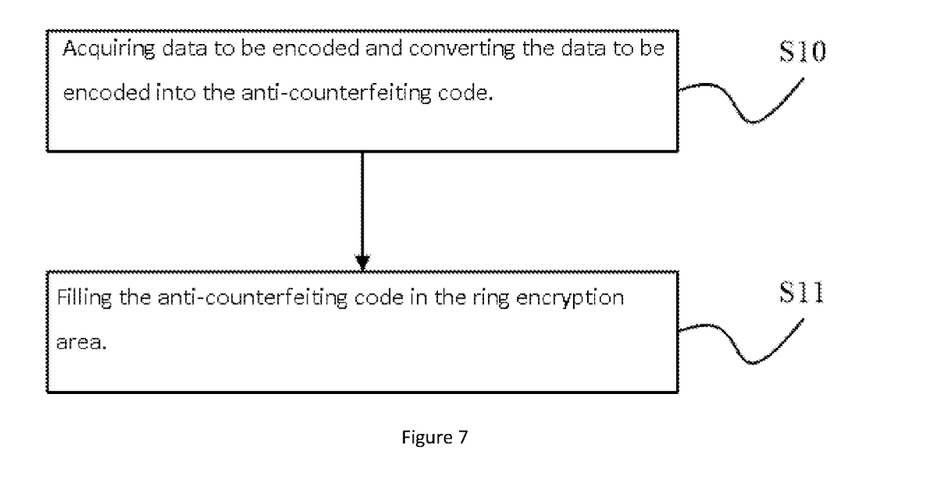
FIG. 7 is an encoding flow chart of the ring code in an embodiment of the present invention.

The present invention also provides an encoding method, as shown in FIG. 7, comprising:
step S10: acquiring data to be encoded and converting the data to be encoded into the anti-counterfeiting code; and
step S11: filling the anti-counterfeiting code in the ring encryption area.

Specifically, removing the starting symbol and the ending symbol after converting the data to be encoded into the anti-counterfeiting code is also comprised.

Specifically, the filling of the anti-counterfeiting code in the ring encryption area comprises: filling at least one anti-counterfeiting code into the ring encryption area, wherein the ring encryption area comprises at least one closed ring, and the at least one anti-counterfeiting code is arranged inside or outside the closed ring.

Figure 8:
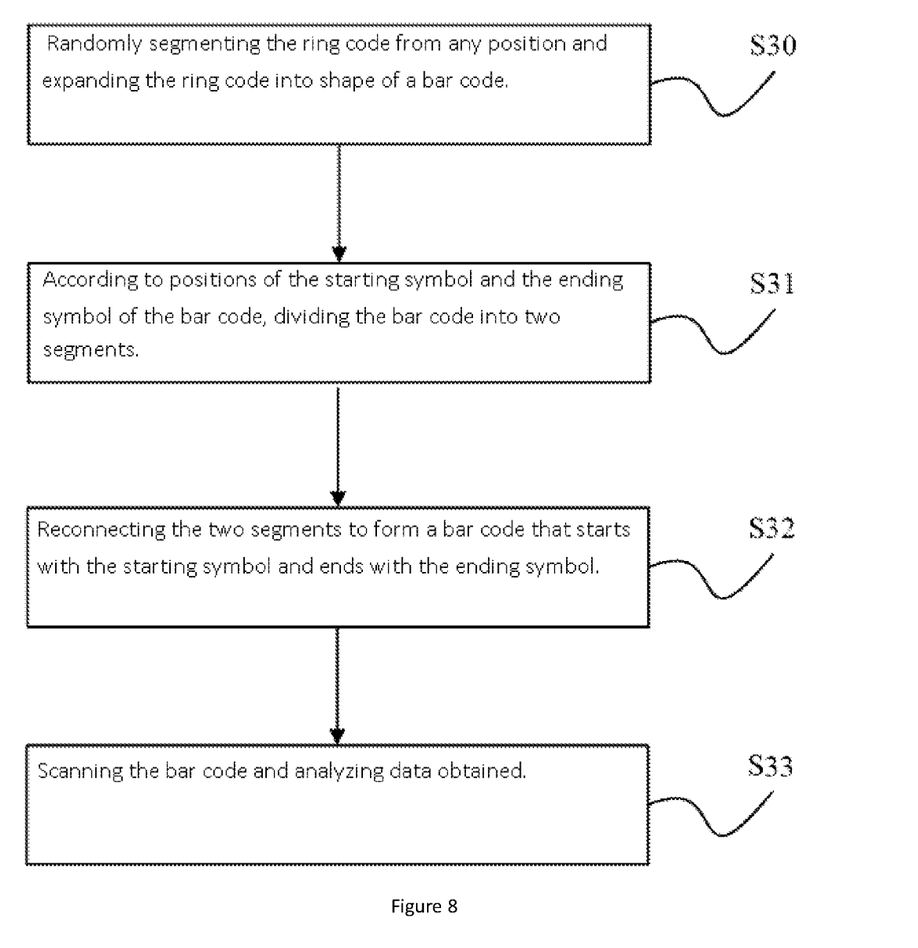
FIG. 8 is a flow chart of an implementation of identifying the ring code in an embodiment of the present invention.

Specifically, as shown in FIG. 8, the present invention provides a method for identifying the ring code, comprising:
step S30: randomly segmenting the ring code from any position and expanding the ring code into shape of a bar code;
step S31: according to positions of the starting symbol and the ending symbol of the bar code, dividing the bar code into two segments;
step S32: reconnecting the two segments to form a bar code that starts with the starting symbol and ends with the ending symbol; and
step S33: scanning the bar code and analyzing data obtained.

Specifically, the embodiments of the present invention encode data through the bar code to form the ring code, and improve recognition speed of the bar code through segmenting and reconnecting.

Figure 9:
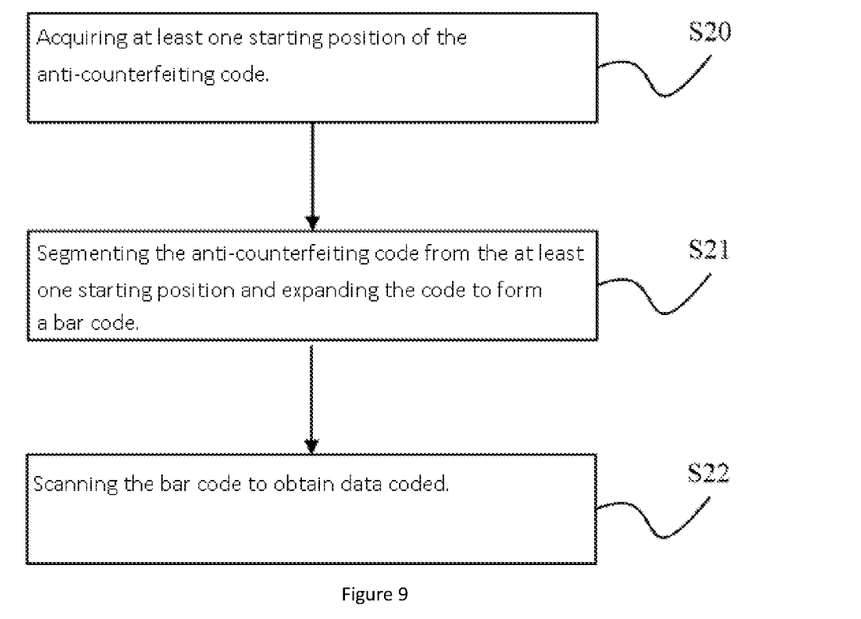
FIG. 9 is a flow chart for identifying the ring code in an embodiment of the present invention.

The embodiments of the present invention provide a method for identifying the ring code, as shown in FIG. 9, comprising:
step S20: acquiring at least one starting position of the anti-counterfeiting code;
step S21: segmenting the anti-counterfeiting code from the at least one starting position and expanding the code to form a bar code; and
step S22: scanning the bar code to obtain data coded.

Figure 10:
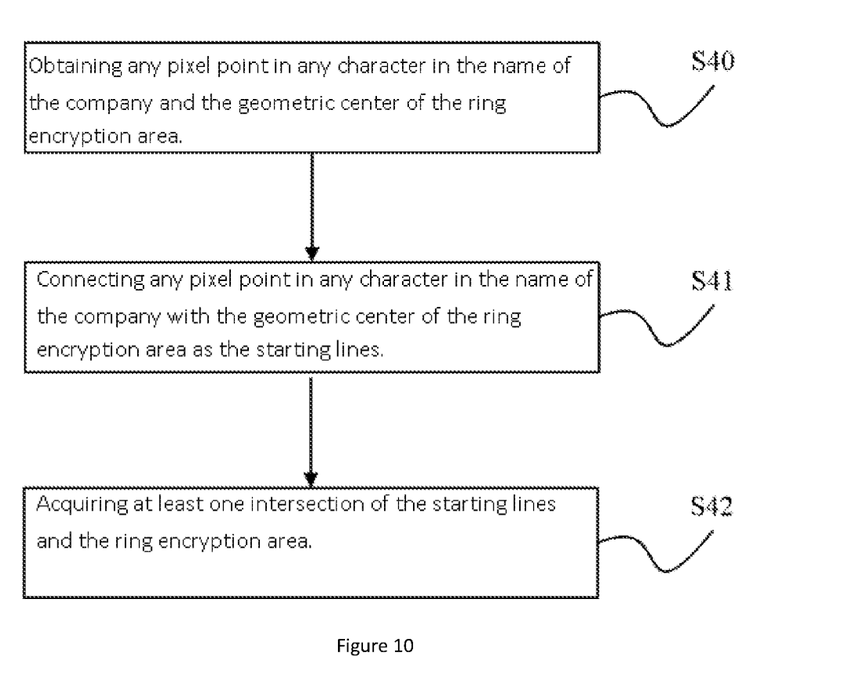
FIG. 10 is a flow chart for identifying a starting position in a ring code in an embodiment of the present invention.

Specifically, as shown in FIG. 10, the obtaining of the at least one starting position of the anti-counterfeiting code comprises:
step S40: obtaining any pixel point in any character in the name of the company and the geometric center of the ring encryption area;
step S41: connecting any pixel point in any character in the name of the company with the geometric center of the ring encryption area as the starting lines; and
step S42: acquiring at least one intersection of the starting lines and the ring encryption area.

Figure 11:
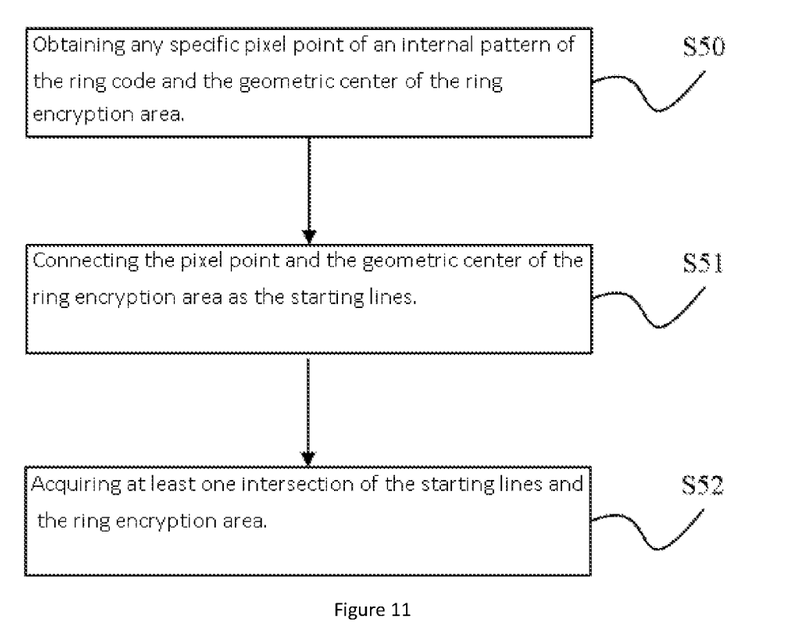
FIG. 11 is a flow chart of obtaining the starting position of an anti-counterfeiting code in a process of identifying the ring code in an embodiment of the present invention.

Specifically, as shown in FIG. 11, the obtaining of the at least one starting position of the anti-counterfeiting code comprises:

step S50: obtaining any specific pixel point of an internal pattern of the ring code and the geometric center of the ring encryption area;

step S51: connecting the pixel point and the geometric center of the ring encryption area as the starting lines; and step S52: acquiring at least one intersection of the starting lines and the ring encryption area.

Specifically, the internal pattern is the five-pointed star, and the specific pixel point is a point where any corner of the five-pointed star is located; and connecting the point of any corner of the five-pointed star with the geometric center of the ring encryption area as the starting lines.

The embodiments of the present invention also provide a seal, which comprises a seal pad and a seal surface, and the seal surface is provided with the ring code as described above.

Specifically, the ring code in the embodiments of the present invention can be formed by surrounding the standard code 93 barcode. According to standards of the code 93 barcode, the ring code can also be divided into "starting symbol, data area, checking symbols (checking symbols C and K)-ending symbol".

Specifically, it is difficult to find the starting and ending positions of the bar code after the bar code is deformed around the ring encryption area. The code 93 bar code has the starting and ending positions with a fixed feature. After the seal is encrypted with the code 93 barcode, the bar code can be restored through the fixed feature. After adopting the code 93 barcode, the ring code can realize anti-counterfeiting protection of the seal with only one encryption area. The ring code is connected at ends, which makes appearance of the ring code more beautiful.

Specifically, process of identifying the ring code is a reverse process of the encoding process, which is further explained below.

Figure 13:
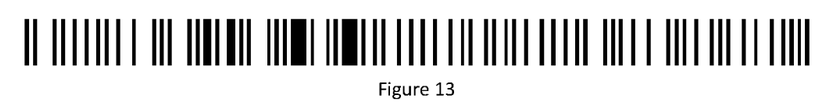
FIGS. 13, 14a, 14b and 15 show an embodiment of the present invention for identifying the ring code.
Figure 14A:
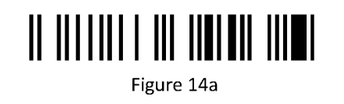
Figure 14B:
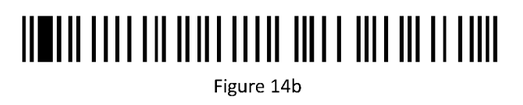
Figure 15:
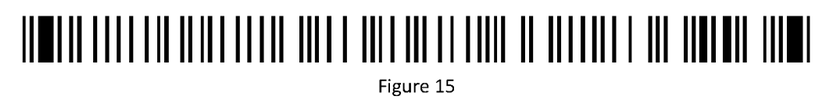

As shown in FIG. 13, after scanning, segmenting the bar code randomly into two sections from any position and expanded the bar code into a bar code shape.

as shown in FIGS. 14a and 14b, according to positions of the starting symbol and the ending symbol of the bar code, dividing the bar code into two segments;

as shown in FIG. 15, reconnecting the two segments to form a bar code in a standard form; and scanning the bar code and analyzing data obtained.

It can be understood that the embodiments of the present invention can also directly identify the at least one starting position, that is, the positions of the starting symbol and the ending symbol, and start the segmentation from the at least one starting position.

Specifically, in the practical application process, the bar code identifies the at least one starting position of the quick response code with help of the at least one starting position and the at least one ending position in the standard code 93 barcode. In the standard code 93 barcode, codes of the starting symbol and the ending symbol are "11141" and "11141" respectively, that is, the number "4" exists respectively in the starting and ending symbols, which leads to extremely thick bar codes in the two positions, which is not only unsightly, but when used for printing the entity seal, the thick bar codes are not easy to dry, and it is liable to stick to hands or other papers, causing the bar code to be blurred. However, according to rules of the code 93 barcode, there are only two kinds of black bar codes with two different widths in the data area, namely "1" or "2". Although a black bar code with a width of "3" occasionally appears in the checking symbols, probability of this appearance is not high. Therefore, most of the remaining black barcodes have widths of "1" or "2" after removing the bar codes with the width of "4" in the at least one starting position and the at least one ending position. The black bar code is thin and tidy, which leads to a lot of improvement in visual effect. Moreover, in the limited space of the ring area of the seal, if the at least one starting position and the at least one ending positions are removed, data capacity of the ring code after improvement increases.

It can be understood that after the at least one starting position or the at least one ending position is removed, a starting position needs to be re-acquired, so as to realize the identification of the code. In the embodiments of the present invention, the at least one starting position is determined by pointing of a certain tip of the five-pointed star in the center of the seal. A specific identification method is as follows:

(1) according to layout position of characters in the seal, identifying vertical direction of the seal;

(2) according to the vertical direction of the seal, identifying relative positions of the five sharp corners of the five-pointed star and the vertical direction at the central position of the seal;

(3) selecting a certain sharp corner (for example, connecting the center of the seal with the tips of the five-pointed star, and selecting the sharp angle that makes the connecting line coincide with the vertical direction of the seal) to form a straight line by connecting the center of the seal and the sharp corner;

(4) obtaining an intersection position of the straight line and the bar code outside the seal;

(5) taking the intersection position as an initial data position, segmenting the ring code, and expanding to form a bar code pattern; and (6) scanning the bar code pattern to obtain data; In this step, if the traditional code 93 decoding method is adopted, it is necessary to add the at least one starting position and the at least one ending position to the expanded barcode to form a complete code 93 barcode, and then scan the complete code 93 barcode; of course, it is also possible to appropriately rewrite the decoding method of code 93 and directly scan the expanded bar code to obtain the data.

Of course, other methods can also be used to obtain data, for example, a connecting line between the center of the seal and a specific position of a specific word on the seal can point to the at least one starting position of the ring code.

The specific position of the specific Chinese character can be position of a rightmost pixel of a last word or a leftmost pixel of a first Chinese character or a position of a rightmost pixel of a third Chinese character, and so on.

For example, (1) when the seal is generated, the central part excluding the surrounding ring code is generated first, and the central part comprises the central five-pointed star, and the company name arc-shaped around the five-pointed star; (2) connecting the center of the seal with the rightmost pixel of the last Chinese character of the company name; (3) taking the intersection position of the connecting line and the ring code as a starting position of the ring code; and (4) generating the ring code according to the starting position.

Specifically, on a circumference of the seal, a plurality of identical ring codes are repeatedly arranged, and same data can be decoded independently in each ring code, so that even if the seal is defaced or damaged or the paper bearing the physical seal is partly torn off, information in the ring code can still be recognized, thus improving the security.

When generating or decoding the arc-shaped ring code, the same way as the first and second embodiments mentioned above can be adopted, that is, using the standard code 93 barcode to bend to form a ring code, or removing the at least one starting position or the at least one ending position of a code 92 barcode, and using pointing of the tips of the five-pointed star or the pointing of a specific position of a specific Chinese character in the seal to determine the at least one starting position of the ring code.

The ring codes mentioned above can be provided with or without an outer ring. When there is no outer ring, the interference to the code scanning is reduced and the code scanning speed and recognition rate is improved.

The ring code in the embodiments of the present invention is a seal pattern encrypted by bar code, which can be stored in the storage media of computers, notebooks, mobile devices, mobile phones and other devices.

The ring code can also be used in electronic seal. Generally, it is difficult to identify authenticity of a file with an electronic signature after the file is printed into a paper file. After printing a PDF file with an encrypted barcode seal or other files using an electronic seal into a paper file, capturing the pattern through a mobile phone, a tablet or other equipment with a camera. After decrypting the barcode, retrieving an original electronic file for comparison, and judging authenticity of the file by checking signature of the electronic file.

This kind of electronic seal can directly output the seal pattern with the encrypted bar code on the paper file through a special intelligent seal.

Specifically, the embodiments of the present invention also provide a seal, and the ring code mentioned above is arranged on a seal surface of the seal.

Specifically, the seal is formed by printing.

Specifically, the ring code is directly output to a paper.

Specifically, the seal is in red, blue or in other colors.

Specifically, the embodiments of the present invention also provides an application method of the ring code, which stores the seal pattern comprising the ring code in a storage medium.

Figure 12:
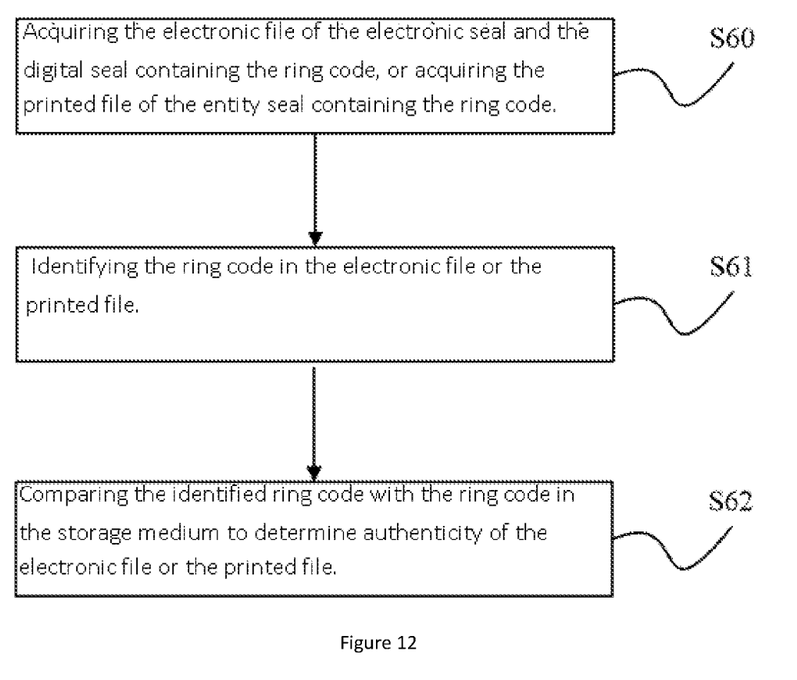
FIG. 12 is a flow chart of an application method of the ring code in an embodiment of the present invention.

Specifically, as shown in FIG. 12, the application method of the ring code provided by the embodiments of the present invention further comprises:

step S60: acquiring the electronic file of the electronic seal and the digital seal containing the ring code, or acquiring the printed file of the entity seal containing the ring code;

step S61: identifying the ring code in the electronic file or the printed file; and step S62: comparing the identified ring code with the ring code in the storage medium to determine authenticity of the electronic file or the printed file.

Specifically, in the embodiments of the present invention, putting the ring code on the electronic file or the printed file, and identifying the information in the ring code, so as to realize authentication of authenticity of the electronic file or the printed file, improve credibility of the file and ensure security of the electronic file or the printed file.

Specifically, the embodiments of the present invention also provide an application method of the ring code, comprising:

acquiring an electronic contract and the electronic file of the electronic seal and digital seal containing the ring code, or acquiring the printed file of the entity seal containing the ring code;

identifying the ring code in the electronic contract, the electronic file or the printed file, wherein the ring code records the anti-counterfeiting information of the seal; and according to the anti-counterfeiting information of the seal, performing authenticity verification of the seal for a third party who needs to verify the seal.

Specifically, the anti-counterfeiting information of the seal comprises, but is not limited to, contents of a contract or file, an abstract of the contract or file, parties to the contract or file, signature time, seal approval process, seal users and the place where the seal is used.

Specifically, by applying the ring code in the electronic seal, the embodiments of the present invention makes the ring code contain verification information, which can be main contents in the file or contents used to characterize the file information such as the parties and the signature time of the file, so that the corresponding information can be obtained through the ring code, so as to distinguish the authenticity of the file and improve the security of the electronic file or the printed file.

Specifically, the embodiments of the present invention also provide the electronic seal or the digital seal; and the electronic seal or digital seal comprises the ring code as described above.

Specifically, the electronic seal is used for displaying on screens.

Specifically, the screens comprise but are not limited to one or more display screens of electronic products such as PC terminals, smart phones, mobile terminals, handheld printing devices, tablet computers, vehicle-mounted computers and the like.

Specifically, the seal is in red or blue or in other colors.

Specifically, the color of the seal can be red, blue and other colors. In the practical applications, red and blue are widely used, which increases universality of the seal. However, it is understandable that in order to improve diversity of the seal, it can also be other colors, such as green and brown, which are not listed here, subject to actual implementation.

Specifically, the embodiments of the present invention also provide an electronic file and the electronic file contains the electronic seal or the digital seal as described above.

Specifically, the electronic file comprises, but is not limited to, electronic contracts, electronic official documents, electronic notices and the like.

Specifically, the electronic file provided by the embodiments of the present invention contains electronic seals or digital seals, so that the security of the electronic file in the embodiments of the present invention is higher, authenticity can be distinguished, and the security of the electronic file can be improved; and corresponding electronic seals or digital seals can be contained in different types of electronic files, so that comprehensive management of the files and the confidentiality of the files can be improved.

So far, the technical solutions of the present invention has been described in connection with the preferred embodiments shown in the attached drawings, but it is easy for those skilled in the art to understand that the protective scope of the present invention is obviously not limited to these specific embodiments. Under the premise of not deviating from principles of the present invention, those skilled in the art can make equivalent changes or substitutions on relevant technical features, and the technical solutions after these changes or substitutions will fall within the protective scope of the present invention.

The above are only the preferred embodiments of the present invention, and are not used to limit the present invention; there are various modifications and variations of the present invention to those skilled in the art. Any modifications, equivalent substitutions, improvements, etc. made within spirit and principle of the present invention should be comprised in the protective scope of the present invention.

The invention claimed is:

1. A ring code used for an electronic seal or a digital seal; wherein contents recorded in the ring code correspond to an electronic file containing the electronic seal or the digital seal, and contents of different electronic files correspond to different ring codes; the ring code comprises an anti-counterfeiting code and a ring encryption area, and the anti-counterfeiting code fills the ring encryption area; wherein the ring code comprises a single encrypted pattern, two or more encrypted patterns, or an identifiable anti-counterfeiting code with any other encrypted pattern.

2. The ring code used for the electronic seal or the digital seal according to claim 1; wherein the electronic seal or the digital seal or the ring code comprises but is not limited to a circle, an ellipse, a square, a rectangle and a triangle.

3. The ring code used for the electronic seal or the digital seal according to claim 1; wherein the electronic seal or the digital seal comprises but is not limited to being used on electronic products, namely, personal computer terminals, smart phones, mobile terminals, handheld printing devices, tablet computers, vehicle-mounted computers, and the electronic seal is displayed through display screens of the electronic products.

4. The ring code used for the electronic seal or the digital seal according to claim 1; wherein the ring code comprises a bar code, or a bar-shaped mixed code formed by combining a bar code with one or more other encrypted patterns, or an identifiable anti-counterfeiting code with any other encrypted patterns.

5. The ring code used for the electronic seal or the digital seal according to claim 4; wherein the bar-shaped mixed code is formed by combining the bar code and a quick response code.

6. The ring code used for the electronic seal or the digital seal according to claim 5; wherein a code head of the bar code or the bar-shaped mixed code is connected with a code tail thereof to form the anti-counterfeiting code; and the code head comprises a starting symbol and the code tail comprises an ending symbol.

7. The ring code used for the electronic seal or the digital seal according to claim 4; wherein the anti-counterfeiting code comprises a code 93 barcode, or a code 93 bar-shaped mixed code composed of the code 93 barcode and one or more other encrypted patterns.

8. The ring code used for the electronic seal or the digital seal according to claim 7; wherein the code head of the code 93 barcode or the code 93 bar-shaped mixed code is connected with the code tail thereof to form the anti-counterfeiting code; and the code head comprises the starting symbol and the code tail comprises the ending symbol.

9. The ring code used for the electronic seal or the digital seal according to claim 8; wherein the anti-counterfeiting code is formed by removing the starting symbol and the ending symbol in the standard code 93 barcode or the code 93 bar-shaped mixed code, and then connecting a head end and a tail end.

10. The ring code used for the electronic seal or the digital seal according to claim 1; wherein the ring code further comprises indicators to indicate starting positions of the anti-counterfeiting code.

11. The ring code used for the electronic seal or the digital seal according to claim 10; wherein the indicators comprise numbers, Chinese characters or words or letters in other languages.

12. The ring code used for the electronic seal or the digital seal according to claim 11; wherein the numbers, the Chinese characters or the words or the letters in other languages comprise a name of the company to which the seal belongs, and connecting lines between any pixel point in any character in the name of the company and a geometric center of the ring encryption area are taken as starting lines, and intersections of the starting lines and the ring encryption area are taken as starting positions.

13. The ring code used for the electronic seal or the digital seal according to claim 12; wherein, the electronic seal or the digital seal comprises, but is not limited to, seals of party committees and government agencies, military, diplomatic, financial, social organizations and schools and research institutes, seals of various enterprises and institutions, seals of various administrative examination and approval, invoices, special seals for financial bills or personal seals.

14. The ring code used for the electronic seal or the digital seal according to claim 10; wherein, indicators comprise patterns.

15. The ring code used for the electronic seal or the digital seal according to claim 14; wherein, the indicators comprise, but are not limited to, a five-pointed star, a party emblem or a national emblem located in the center of the seal; and
when one of the patterns is the five-pointed star, with the connecting lines between any corner of the five-pointed star and the geometric center of the ring encryption area as the starting lines, and the intersections of the starting lines and the ring encryption area as the starting positions.

16. The ring code used for the electronic seal or the digital seal according to claim 1; wherein, the anti-counterfeiting code is repeated at least twice on a whole circumference or a frame of the seal.

17. The ring code used for the electronic seal or the digital seal according to claim 1; wherein, the ring encryption area is arranged inside or outside a closed boundary line of the seal; correspondingly, an inner or outer boundary of the ring encryption area comprises or does not comprise the closed boundary line.

18. A ring code used for an entity seal; wherein the ring code for the entity seal comprises the ring code described in claim 1.

19. A seal, wherein the ring code as claimed in claim 18 is arranged on a seal surface.

20. The seal according to claim 19, wherein the seal is formed by printing.

21. The seal according to claim 20, wherein the ring code is directly output to a paper.

22. The seal according to claim 20, wherein the seal is in red, blue or in other colors.

23. An application method of the ring code according to claim 1, wherein a seal pattern comprising the ring code is stored in a storage medium.

24. The application method of the ring code according to claim 23, wherein:
acquiring the electronic file of the electronic seal and the digital seal containing the ring code, or acquiring a printed file of the entity seal containing the ring code;
identifying the ring code in the electronic file or the printed file; and
comparing the identified ring code with the ring code in the storage medium to determine authenticity of the electronic file or the printed file.

25. The application method of the ring code according to claim 1, wherein:

acquiring an electronic contract and the electronic file of the electronic seal and the digital seal containing the ring code, or acquiring the printed file of the entity seal containing the ring code;

identifying the ring code in the electronic contract, the electronic file or the printed file;

the ring code records anti-counterfeiting information of the seal; and according to the anti-counterfeiting information of the seal, performing authenticity verification of the seal for a third party who needs to verify the seal.

26. The application method of the ring code according to claim 25, wherein:

the anti-counterfeiting information of the seal comprises, but is not limited to, full text or part of the contract, full text or abstract of the file, parties to the contract or file, signature time, seal approval process, seal users and the place where the seal is used.

27. An electronic seal or digital seal, wherein the ring code as claimed in claim 1 is contained.

28. The electronic seal or the digital seal according to claim 27, wherein the electronic seal is used for displaying on screens.

29. The electronic seal or the digital seal according to claim 27, wherein the seal is in red or blue or in other colors.

30. An electronic file, wherein the electronic file contains the electronic seal or the digital seal according to claim 27; the electronic file comprises but is not limited to, electronic contracts, electronic official documents, electronic notices.

31. A method for identifying the ring code, comprising:

randomly segmenting the ring code from any position and expanding the ring code into shape of a bar code;

according to positions of the starting symbol and the ending symbol of the bar code, dividing the bar code into two segments;

reconnecting the two segments to form a bar code that starts with the starting symbol and ends with the ending symbol; and scanning the bar code and analyzing data obtained.

32. The method for identifying the ring code according to claim 31, comprising: acquiring at least one starting position of the anti-counterfeiting code; segmenting the anti-counterfeiting code from the at least one starting position and expanding the anti-counterfeiting code to form a scanning the bar code to obtain coded data; wherein obtaining the at least one starting position of the anti-counterfeiting code comprises: obtaining any pixel point in any character in the name of the company to which the seal belongs and the geometric center of the ring encryption area: connecting any pixel point in any character in the name of the company with the geometric center of the ring encryption area as the starting lines; and acquiring at least one intersection of the starting lines and the ring encryption area.

33. The method for identifying the ring code according to claim 32, wherein obtaining the at least one starting position of the anti-counterfeiting code comprises: obtaining any specific pixel point of an internal pattern of the ring code and the geometric center of the ring encryption area;

connecting the pixel point and the geometric center of the ring encryption area as the starting lines; and acquiring the at least one intersection of the starting lines and the ring encryption area.

34. The method for identifying the ring code according to claim 33, wherein the internal pattern comprises the five-pointed star, and the specific pixel point comprises the point where any corner of the five-pointed star is located; and connecting the point of any corner of the five-pointed star with the geometric center of the ring encryption area as the starting lines.

* * * * *